US012583688B2

(12) United States Patent
Sato et al.

(10) Patent No.: US 12,583,688 B2
(45) Date of Patent: Mar. 24, 2026

(54) ARTICLE CONVEYANCE SORTING APPARATUS, ARTICLE SORTING SYSTEM, AND CONTROL SERVER

(71) Applicant: KABUSHIKI KAISHA TOSHIBA, Tokyo (JP)

(72) Inventors: Masataka Sato, Kawasaki (JP); Takashi Aoki, Kawasaki (JP)

(73) Assignee: KABUSHIKI KAISHA TOSHIBA, Kawasaki (JP)

( * ) Notice: Subject to any disclaimer, the term of this patent is extended or adjusted under 35 U.S.C. 154(b) by 851 days.

(21) Appl. No.: 17/822,736

(22) Filed: Aug. 26, 2022

(65) Prior Publication Data

US 2024/0124245 A1 Apr. 18, 2024

Related U.S. Application Data

(63) Continuation of application No. PCT/JP2021/005924, filed on Feb. 17, 2021.

(30) Foreign Application Priority Data

Feb. 26, 2020 (JP) ................................. 2020-030401

(51) Int. Cl.
*B65G 43/10* (2006.01)
*B65G 47/46* (2006.01)

(52) U.S. Cl.
CPC ............. *B65G 43/10* (2013.01); *B65G 47/46* (2013.01); *B65G 2201/02* (2013.01)

(58) Field of Classification Search
CPC .... B65G 43/10; B65G 47/46; B65G 2201/02; B65G 2203/025; B65G 43/08; B07C 5/36; G06Q 10/08
See application file for complete search history.

(56) References Cited

U.S. PATENT DOCUMENTS 12,122,618 B1 * 10/2024 Ruffatto ................. B65G 47/34
2014/0364998 A1 12/2014 Neiser et al.
(Continued)

FOREIGN PATENT DOCUMENTS

JP H8-198436 A 8/1996
JP H10-120118 A 5/1998
(Continued)

OTHER PUBLICATIONS

European Patent Office, Extended European Search Report in EP 21761519.4, 6 Pages (Jan. 30, 2024).
(Continued)

*Primary Examiner* — Michael Collins
(74) *Attorney, Agent, or Firm* — Finnegan, Henderson, Farabow, Garrett & Dunner, LLP

(57) ABSTRACT

According to an embodiment, an article conveyance sorting apparatus includes a distributing section, a first conveyance section, a second conveyance section, and a conveyance sorting section. The distributing section distributes an article in a first direction or a second direction based on a first distribution control signal or a second distribution control signal corresponding to a distinguishing result of the article distinguished based on article information. The first conveyance section receives the article distributed in the first direction. The second conveyance section receives the article distributed in the second direction. The conveyance sorting section sorts each of articles conveyed by the plurality of trays to a designated sorting destination.

6 Claims, 5 Drawing Sheets

(56) References Cited

U.S. PATENT DOCUMENTS

| 2015/0001137 A1* | 1/2015 | Layne .................... B65G 37/00 |
| | | 209/552 |
| 2016/0176562 A1 | 6/2016 | Pettersson et al. |
| 2016/0199884 A1* | 7/2016 | Lykkegaard ....... G05B 19/4182 |
| | | 700/223 |
| 2016/0332823 A1* | 11/2016 | Yang ..................... B65H 33/16 |
| 2017/0233188 A1 | 8/2017 | Tai |
| 2019/0151901 A1 | 5/2019 | Vegh et al. |

FOREIGN PATENT DOCUMENTS

| JP | 2007-297171 A | 11/2007 |
| JP | 2012-201502 A | 10/2012 |
| JP | 2016-60626 A | 4/2016 |
| JP | 2016-532608 A | 10/2016 |
| JP | 2017-24812 A | 2/2017 |
| JP | 2017-39170 A | 2/2017 |
| JP | 2019-189426 A | 10/2019 |
| WO | WO 2015/032402 A1 | 3/2015 |
| WO | WO 2016/031351 A1 | 3/2016 |

OTHER PUBLICATIONS

Japan Patent Office, International Search Report issued in PCT/JP2021/005924 (Apr. 27, 2021), 3 pages.

* cited by examiner

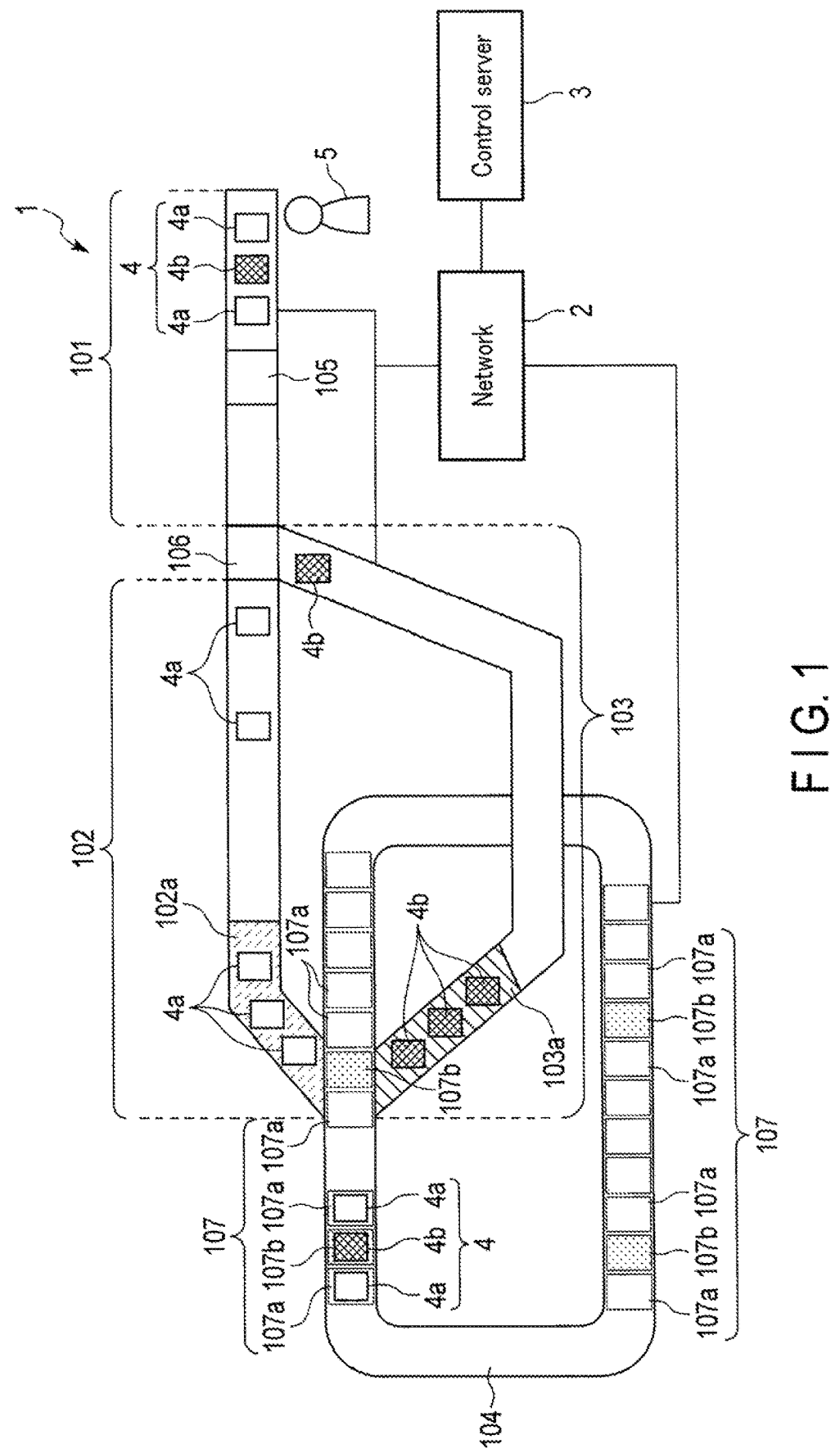
F I G. 1

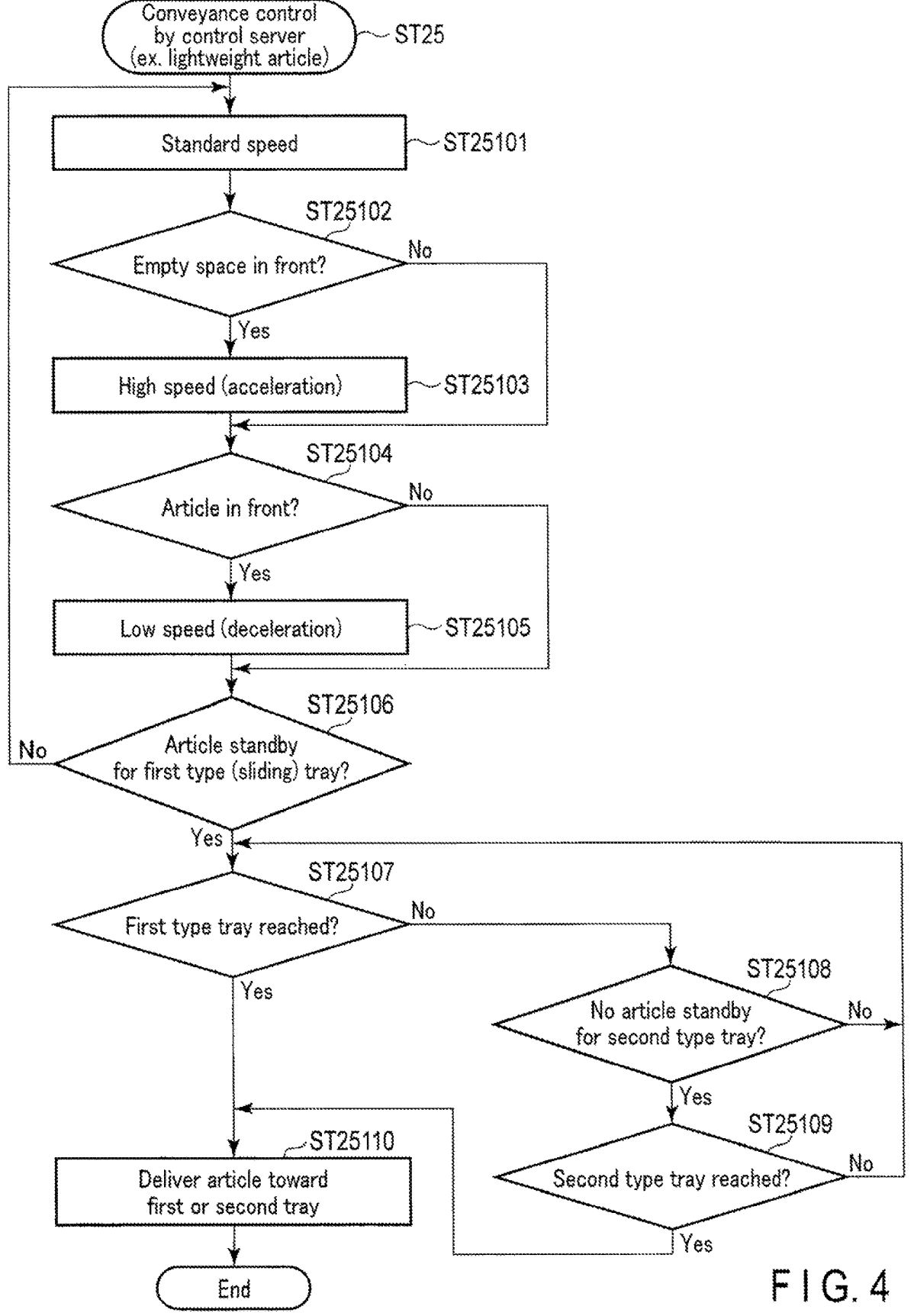
F I G. 4

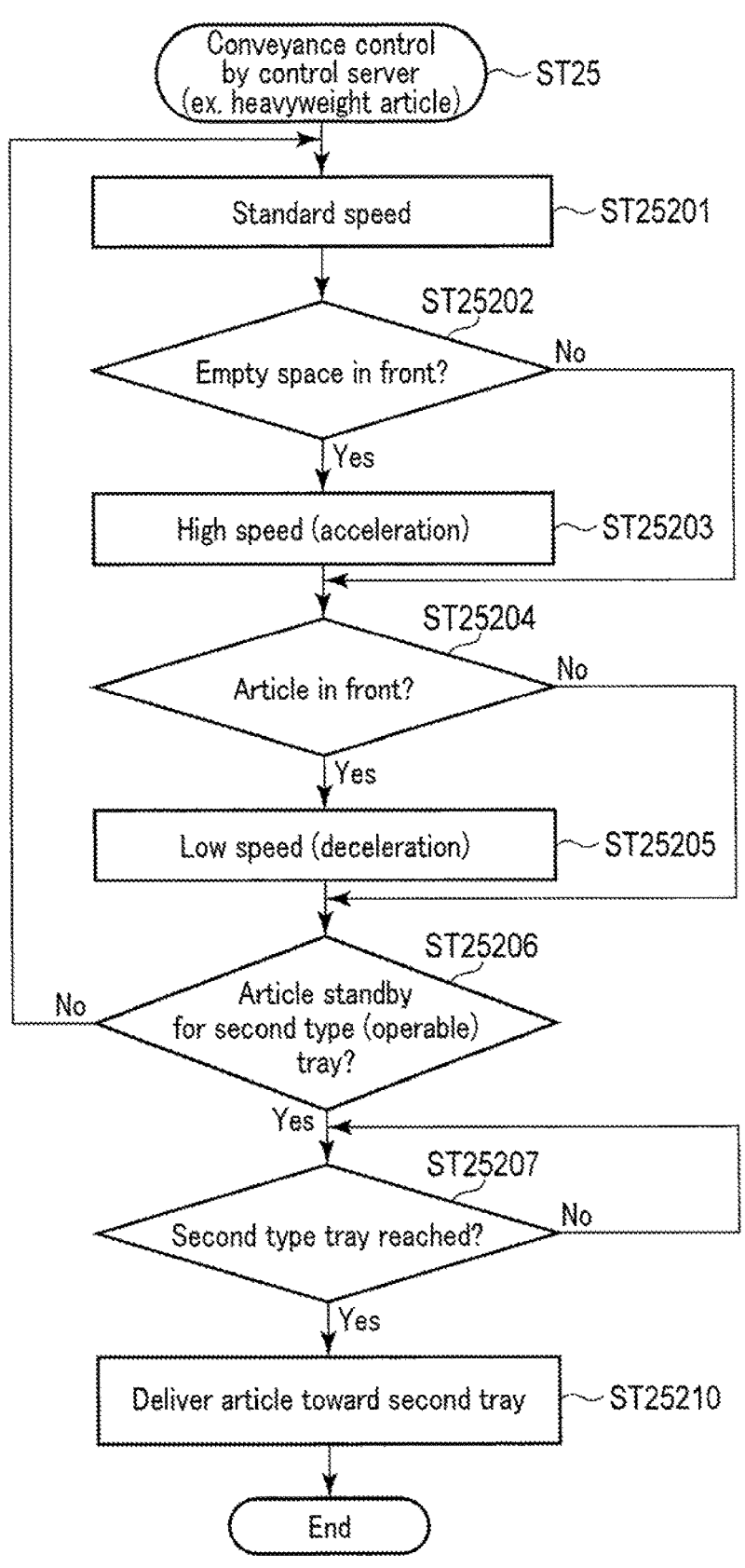
F I G. 5

ARTICLE CONVEYANCE SORTING APPARATUS, ARTICLE SORTING SYSTEM, AND CONTROL SERVER

CROSS REFERENCE TO RELATED APPLICATIONS

This application is a Continuation Application of PCT Application No. PCT/JP2021/005924, filed Feb. 17, 2021 and based upon and claiming the benefit of priority from Japanese Patent Application No. 2020-030401, filed Feb. 26, 2020, the entire contents of all of which are incorporated herein by reference.

FIELD

Embodiments described herein relate generally to an article conveyance sorting apparatus, an article sorting system, and a control server.

BACKGROUND

Sorting systems for automating the sorting of articles, such as packages or paper sheets, have become widespread. For example, the sorting system includes a main conveyance path section and a sorter, reads an image of an article conveyed by a main conveyance section, recognizes destination information included in the image, and designates a sorting destination according to a destination recognition result. Further, the sorting system feeds an article from the main conveyance section to the sorter, and sorts the article by the sorter to a designated sorting destination according to the destination recognition result of the article circulated and conveyed.

The above-described sorter circulates and conveys a plurality of trays, and the main conveyance section delivers each article toward a tray that is circulated and conveyed. The sorter discharges the article contained in the tray toward the designated sorting destination at a timing when the tray reaches a position corresponding to the designated sorting destination.

BRIEF DESCRIPTION OF THE DRAWINGS

FIG. 1 is a diagram illustrating an example of a schematic configuration of an article sorting system according to an embodiment.

FIG. 4 is a flowchart illustrating an example of conveyance control of an article (for example, a lightweight article) to a tray of a first type by the control server of the article sorting system according to the embodiment.

FIG. 5 is a flowchart illustrating an example of conveyance control of an article (for example, a heavyweight article) to a tray of a second type by the control server of the article sorting system according to the embodiment.

DETAILED DESCRIPTION

Figure 2:
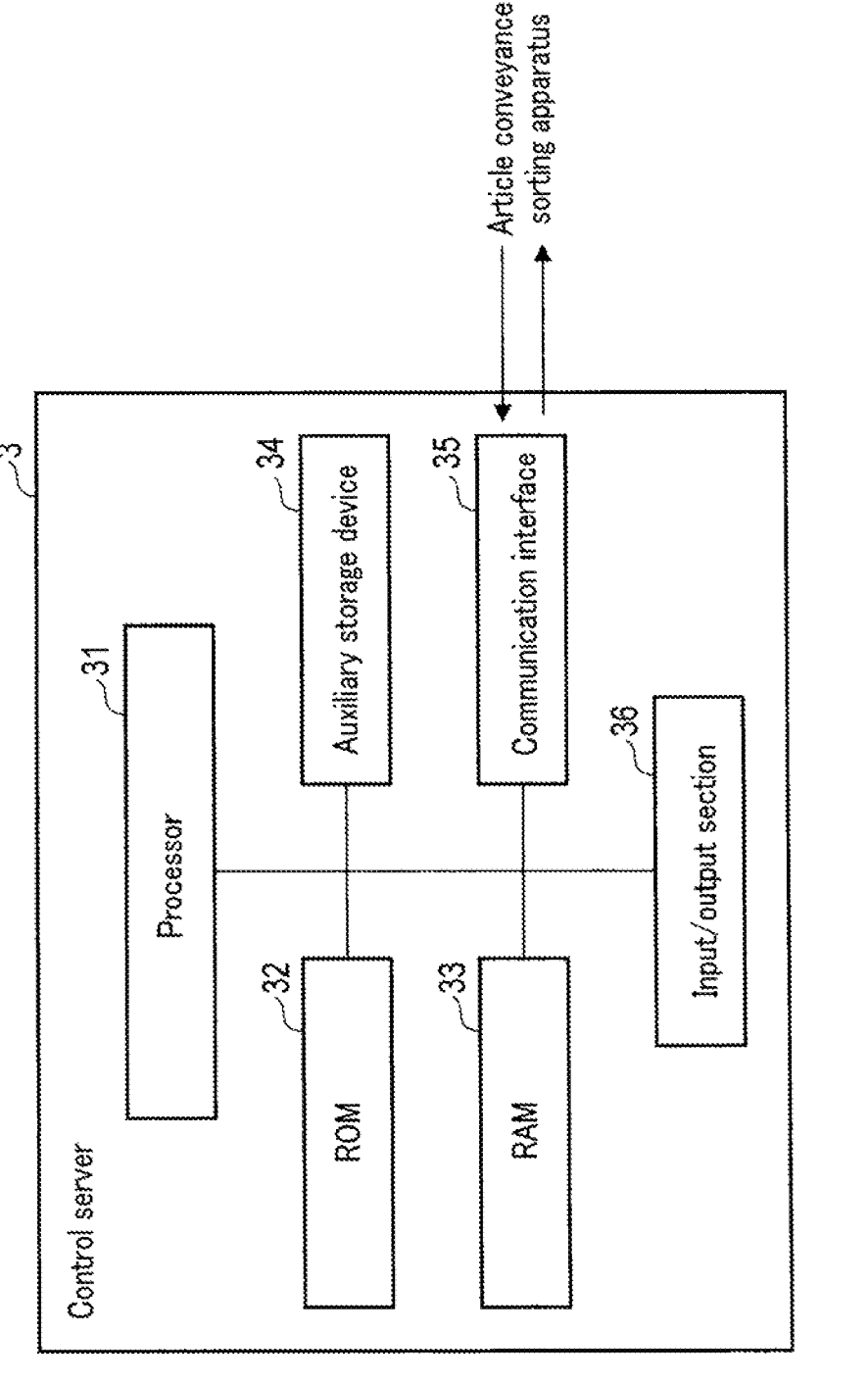
FIG. 2 is a block diagram illustrating an example of a schematic configuration of a control server included in the article sorting system according to the embodiment.

According to an embodiment, an article conveyance sorting apparatus includes a distributing section, a first conveyance section, a second conveyance section, and a conveyance sorting section. The distributing section distributes an article in a first direction or a second direction based on a first distribution control signal or a second distribution control signal corresponding to a distinguishing result of the article distinguished based on article information. The first conveyance section receives the article distributed in the first direction, and conveys the article based on a first conveyance control signal toward a tray of a first type among a plurality of trays sequentially conveyed. The second conveyance section receives the article distributed in the second direction, and conveys the article based on a second conveyance control signal toward a tray of a second type among the plurality of trays sequentially conveyed. The conveyance sorting section conveys the plurality of trays including the tray of the first type and the tray of the second type, and sorts each of articles conveyed by the plurality of trays to a designated sorting destination based on a sorting control signal.

Hereinafter, an embodiment will be described with reference to the drawings.

FIG. 1 is a diagram illustrating an example of a schematic configuration of an article sorting system according to an embodiment.

As illustrated in FIG. 1, the article sorting system includes an article conveyance sorting apparatus 1, a network 2, and a control server 3.

The article conveyance sorting apparatus 1 conveys a plurality of articles 4 in order, distributes the articles 4 in midstream based on a distinguishing result of the articles 4, and sorts the articles 4 to designated sorting destinations based on a sorting destination determination result of the articles 4. The article conveyance sorting apparatus 1 includes a plurality of article detection sensors along a conveyance path of the articles 4, and a plurality of tray detection sensors along a conveyance path of trays 107 for circulating and conveying the articles 4. The article conveyance sorting apparatus 1 outputs detection signals from the article detection sensors and the tray detection sensors to the control server 3 via the network 2. Further, the article conveyance sorting apparatus 1 executes conveyance (including delivery timing), distributing, sorting, and the like of the article 4 based on a control signal transmitted from the control server 3 via the network 2. The network 2 functions to transmit and receive signals between the article conveyance sorting apparatus 1 and the control server 3. The control server 3 receives an article detection signal and a tray detection signal from the article conveyance sorting apparatus 1, receives article information, and outputs a control signal for controlling article processing (conveyance, distributing, sorting, and the like) by the article conveyance sorting apparatus 1.

The article conveyance sorting apparatus 1 includes a take-in section 101, a first conveyance section 102, a second conveyance section 103, a conveyance sorting section 104, a reading section 105, a distributing section 106, and trays 107. The take-in section 101 takes in the article 4 introduced by an operator 5 or the article 4 fed by a conveyance belt or the like, conveys the taken-in article 4 toward the reading section 105, and further conveys the article 4 having passed through the reading section 105 toward the distributing section 106.

The reading section 105 reads or measures various kinds of information on the article 4 and outputs article information. For example, the reading section 105 captures images of the article 4 from an upper surface, a side surface, and a lower surface of the article 4, and outputs the captured images. The reading section 105 also measures the size, shape, weight, and the like of the conveyed article 4, and outputs measurement information. Further, the reading section 105 reads an article ID from the article 4 and outputs the read article ID. When the article ID is a QR code (registered trademark), the reading section 105 functions as a QR code reader. When the article ID is information stored in a wireless tag, the reading section 105 functions as a wireless reader and reads the article ID from the wireless tag by wireless communication.

The distributing section 106 distributes the article 4 in a first direction (that is, to the first conveyance section 102) based on a first distribution control signal corresponding to the distinguishing result of the article 4 distinguished based on the article information, and distributes the article 4 in a second direction (that is, to the second conveyance section 103) based on a second distribution control signal corresponding to the distinguishing result. For example, an article 4 (article 4a) having a weight equal to or less than a weight reference value is distinguished as a lightweight article, and an article 4 (article 4b) heavier than the weight reference value is distinguished as a heavyweight article. The distributing section 106 distributes the article 4a to the first conveyance section 102 based on the first distribution control signal corresponding to the distinguishing of the lightweight article, and distributes the article 4b to the second conveyance section 103 based on the second distribution control signal corresponding to the distinguishing of the heavyweight article.

The first conveyance section 102 conveys articles by an article conveyor. The first conveyance section 102 receives the article 4a distributed in the first direction by the distributing section 106, and conveys the article 4a toward a tray of a first type 107a (a tray for conveying the article 4a to a designated sorting destination) among the plurality of trays 107 conveyed by the conveyance sorting section 104 based on a first conveyance control signal. The first conveyance section 102 may convey the article 4a toward the tray 107b depending on the setting of the conveyance control. The first conveyance section 102 includes a first conveyance speed adjustment section 102a. The first conveyance speed adjustment section 102a functions as a buffer that variably adjusts the conveyance speed of the article 4a, and includes a stopper that adjusts the delivery timing of the article 4a to, for example, the sorting conveyance section 104. The first conveyance speed adjustment section 102a variably controls the conveyance speed of the article 4a based on the first conveyance control signal. The timing at which the article 4a is delivered from the first conveyance section 102 to the conveyance sorting section 104 (tray 107a or 107b) is adjusted by the variable adjustment of the conveyance speed of the article 4a by the first conveyance speed adjustment section 102a and the timing at which the stopper is opened.

The second conveyance section 103 conveys articles by a transfer conveyor. The second conveyance section 103 receives the article 4b distributed in the second direction by the distributing section 106, and conveys the article 4b toward a tray of a second type 107b (a tray for conveying the article 4b to a designated sorting destination) among the plurality of trays 107 conveyed by the conveyance sorting section 104 based on a second conveyance control signal. The second conveyance section 103 includes a second conveyance speed adjustment section 103a. The second conveyance speed adjustment section 103a functions as a buffer that variably adjusts the conveyance speed of the article 4b, and includes a stopper that adjusts the delivery timing of the article 4b to, for example, the sorting conveyance section 104. The second conveyance speed adjustment section 103a variably controls the conveyance speed of the article 4b based on the second conveyance control signal. The timing at which the article 4b is delivered from the second conveyance section 103 to the conveyance sorting section 104 (tray 107b) is adjusted by the variable adjustment of the conveyance speed of the article 4b by the second conveyance speed adjustment section 103a and the timing at which the stopper is opened.

The conveyance sorting section 104 conveys the plurality of trays 107 by a circulation conveyor, and sorts the articles 4 conveyed by the plurality of trays 107 to the designated sorting destinations based on sorting control signals. The plurality of trays 107 include the trays of the first type 107a and the trays of the second type 107b. For example, the tray 107a is an openable tray, including a partition on its periphery, and further includes a mechanism for opening a part (for example, a bottom) thereof. A part of the openable tray is opened by driving an opening member at a position corresponding to the sorting destination, and the package contained in the openable tray freely falls from the opening part. The package is sorted to the sorting destination by using free fall. For example, the tray 107b is a sliding tray and does not have a complete partition. A package is sorted to a sorting destination through a slope or the like by sliding the package on a sliding tray at a position corresponding to the sorting destination.

The network 2 receives signals and information from each section of the article conveyance sorting apparatus 1, and transmits them to the control server 3. In addition, the network 2 receives various control signals from the control server 3, and transmits the control signals to each section of the article conveyance sorting apparatus 1.

The control server 3 can be realized by one computer or a combination of a plurality of computers. The control server 3 communicates with an external apparatus, such as the article conveyance sorting apparatus 1, receives and stores a signal from the external apparatus, and transmits a control signal or the like to the external apparatus to control the external apparatus. For example, the control server 3 monitors article detection signals from the article detection sensors, traces conveyance (movement) of each article 4, and detects or estimates where each article 4 is located. Similarly, the control server 3 monitors tray detection signals from the tray detection sensors, traces conveyance (movement) of each tray, and detects or estimates where each tray is located. Furthermore, the control server 3 may allocate article detection identification information (hereinafter referred to as the article detection ID (identification information)) to each article 4 detected by the article detection sensors and manage each article 4 based on the article detection ID. Similarly, the control server 3 may allocate tray detection identification information (hereinafter referred to as the tray detection ID) to each tray detected by the tray detection sensors and manage each tray based on the tray detection ID.

The articles 4 processed by the article sorting system include packages of various sizes, shapes, and weights. Destination information (article sorting information) may be recorded in each article 4, and article identification information (hereinafter referred to as an article ID) may be allocated to each article in advance. For example, the destination information is directly or indirectly recorded for each article, and the article ID is directly or indirectly recorded for each article. The article ID may be an article ID recorded by a recording method of either visible printing or invisible printing with ink that absorbs infrared rays or the like. Alternatively, an electronic tag or a wireless tag storing the article ID may be attached to the article.

The article ID at a minimum includes unique information and is constituted by one or a combination of two or more of a number, a character, a symbol, a bar code, a two-dimensional code, and a QR code (registered trademark). The control server 3 stores an article management table for managing the article ID allocated to each article 4 and the destination information read and recognized from each article 4 in association with each other. Further, the control server 3 stores a sorting management table that associates the destination information with each sorting destination.

FIG. 2 is a block diagram illustrating an example of a schematic configuration of a control server included in the article sorting system according to the embodiment.

As illustrated in FIG. 2, the control server 3 includes a processor 31, a read-only memory (ROM) 32, a random-access memory (RAM) 33, an auxiliary storage device 34, a communication interface 35, and an input/output section 36.

The processor 31 corresponds to a central portion of a computer that performs processing such as calculation and control necessary for article processing. The processor 31 executes control to realize various functions based on a program such as system software, application software, or firmware stored in at least one of the ROM 32 and the auxiliary storage device 34. The processor 31 is, for example, a central processing unit (CPU), a micro processing unit (MPU), or a digital signal processor (DSP). Alternatively, the processor 31 is a combination of two or more of these.

The processor 31 allocates an article detection ID to each of the articles 4a and 4b to be detected based on article detection signals from the article detection sensors, traces the conveyance (movement) of each of the articles 4a and 4b, and detects or estimates where each of the articles 4a and 4b is located. The processor 31 allocates an article detection ID to each of the trays 107a and 107b to be detected based on tray detection signals from the tray detection sensors, traces the conveyance (movement) of each of the trays 107a and 107b, and detects or estimates where each of the trays 107a and 107b is located.

The processor 31 monitors the movement amount of each of the transfer conveyor and the circulation conveyor based on a signal from a rotary encoder that detects the movement amount of the transfer conveyor of the first conveyance section 102, a signal from a rotary encoder that detects the movement amount of the transfer conveyor of the second conveyance section 103, and a signal from a rotary encoder that detects the movement amount of the circulation conveyor of the conveyance sorting section 104. For example, the processor 31 can correct the positions of the articles 4 and the positions of the trays 107 based on the amounts of movement of the transfer conveyors and the circulation conveyor.

The ROM 32 is a computer-readable storage medium, and corresponds to a main storage device of the computer including the processor 31 as a center. The ROM 32 is a non-volatile memory (non-transitory storage medium) that is exclusively used for reading data. The ROM 32 may store at least a portion of the program described above. In addition, the ROM 32 stores data or various setting values and the like used when the processor 31 performs various processes.

The RAM 33 is a computer-readable storage medium, and corresponds to a main storage device of the computer including the processor 31 as a center. The RAM 33 is a memory used for reading and writing data. The RAM 33 is utilized as a so-called work area for storing data to be temporarily used when the processor 31 performs various processes.

The auxiliary storage device 34 is a computer-readable storage medium, and corresponds to an auxiliary storage device of the computer including the processor 31 as a center. The auxiliary storage device 34 is a non-transitory storage medium, such as an electric erasable programmable read-only memory (EEPROM) (registered trademark), a hard disk drive (HDD), or a solid state drive (SSD). The auxiliary storage device 34 may store at least a portion of the program described above. In addition, the auxiliary storage device 34 stores data to be used by the processor 31 when performing various types of processing, data generated by the processing performed by the processor 31, or various setting values, and the like. For example, the auxiliary storage device 34 stores an article management table for managing the article ID allocated to each article 4 and the destination information read and recognized from each article in association with each other. Further, the auxiliary storage device. 34 stores a sorting management table that associates the destination information with each sorting destination.

The program stored in at least one of the ROM32 and the auxiliary storage device 34 includes a program for article processing. As an example, the control server 3 is transferred to a business entity which has installed the article sorting system with the program being stored in at least one of the ROM 32 and the auxiliary storage device 34. Alternatively, the program may be transferred to the business entity or the like by a non-transitory computer-readable storage medium storing the program. In this case, the program stored in the non-transitory computer-readable storage medium is written to at least one of the ROM 32 and the auxiliary storage device 34 under an operation by the administrator, a service person, or the like. The non-transitory computer-readable storage medium storing the program is, for example, a removable storage medium, such as a magnetic disk, a magneto-optical disk, an optical disk, or a semiconductor memory. Alternatively, the program may be downloaded via a network or the like and written to at least one of the ROM 32 and the auxiliary storage device 34.

The communication interface 35 is an interface for performing wired or wireless communication with another apparatus via a network or the like, receiving various types of information transmitted from another apparatus, and transmitting these various types of information to another apparatus. For example, the communication interface 35 receives the article ID from the server before the start of article processing. Further, the communication interface 35 receives an article detection signal from the article detection sensor, a tray detection signal from the tray detection sensor, and article information from the reading section 105. Further, the communication interface 35 transmits the first or second distribution control signal to the distributing section 106, transmits the first conveyance control signal to the first conveyance section 103, transmits the second conveyance control signal to the second conveyance section 104, and transmits the sorting control signal to the conveyance sorting section 104.

The input/output section 36 includes a keyboard, a numeric keypad, a mouse, a touch panel display, and the like. The input/output section 36 receives an instruction input from the operator and notifies the processor 31 of the instruction input. The touch panel display displays various types of information for the operator.

Figure 3:
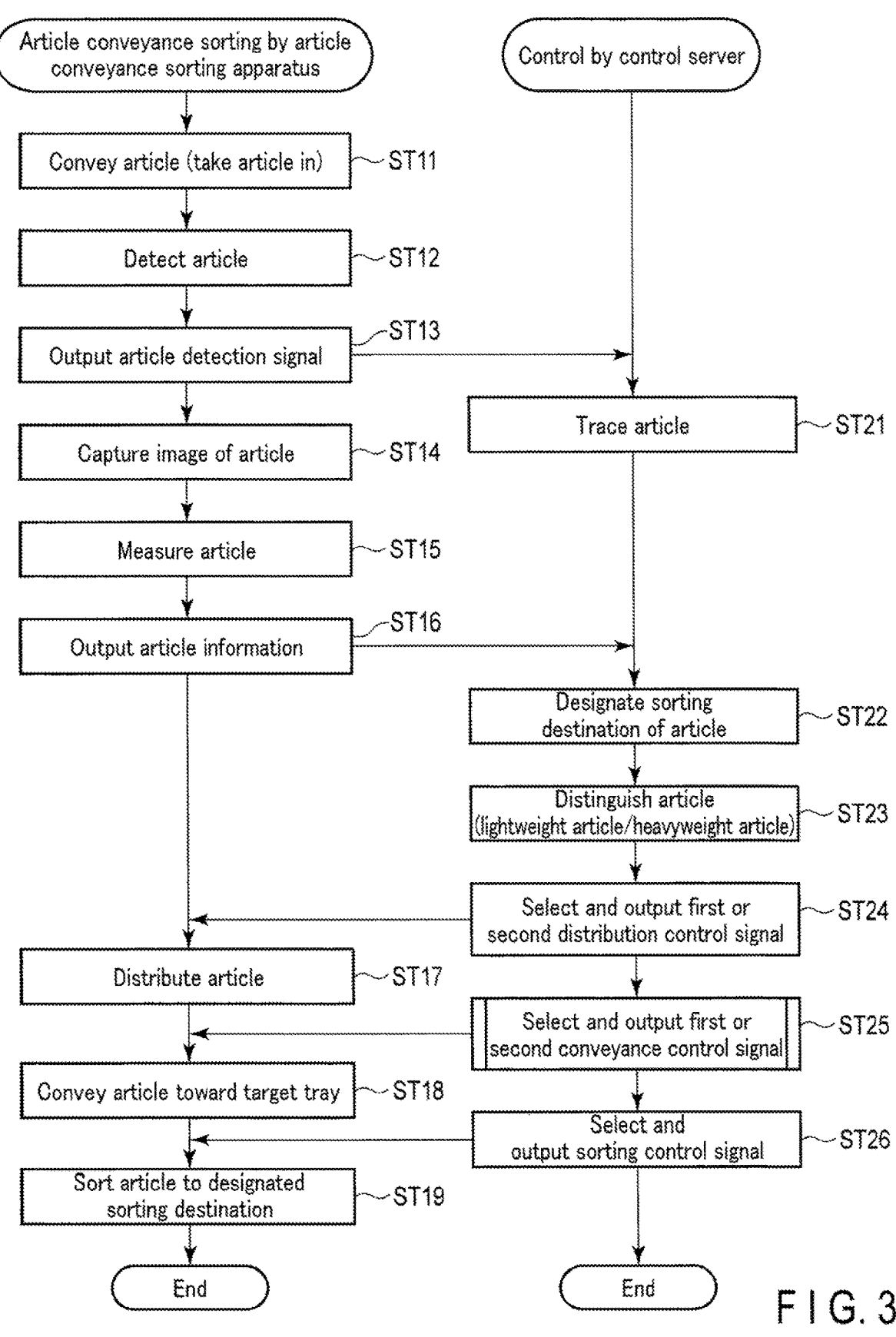
FIG. 3 is a flowchart illustrating an example of an article sorting process performed by the article sorting system according to the embodiment.

FIG. 3 is a flowchart illustrating an example of an article sorting process performed by the article sorting system according to the embodiment.

The take-in section 101 of the article conveyance sorting apparatus 1 sequentially takes in the articles 4 and conveys the taken-in articles 4 (ST11). The article conveyance sorting apparatus 1 detects the conveyed article 4 (ST12) and outputs an article detection signal (ST13).

Based on the article detection signal received via the communication interface 35, the processor 31 of the control server 3 starts tracing the article 4 (ST21). The processor 31 starts tracing of each of the articles 4 based on the article detection signals corresponding to the articles 4 sequentially taken in by the take-in section 101 (ST21).

The reading section 105 captures an image of the article 4 sequentially conveyed by the take-in section 101 (ST14), measures the size, shape, weight, and the like of the article 4 (ST15), and outputs article information including the captured image and measurement information (ST16).

The processor 31 determines the sorting destination of the article based on the article information received via the communication interface 35, and designates the sorting destination according to the sorting destination determination result (ST22). For example, the processor 31 recognizes the destination information from the captured image included in the article information, and designates the sorting destination according to the destination recognition result. Alternatively, the processor 31 may designate the sorting destination based on the article ID included in the article information.

Further, the processor 31 distinguishes the article based on the article information received via the communication interface 35 (ST23). For example, based on the weight information included in the article information, the processor 31 distinguishes an article 4 (article 4a) having a weight equal to or less than the weight reference value as a lightweight article, and determines an article 4 (article 4b) heavier than the weight reference value as a heavyweight article (ST23).

When the processor 31 distinguishes the article 4 as a lightweight article, the processor 31 selects the first distribution control signal for distributing the article 4a in the first direction, and the communication interface 35 outputs the selected first distribution control signal (ST24). When the processor 31 distinguishes the article 4 as a heavyweight article, the processor 31 selects the second distribution control signal for distributing the article 4b in the second direction, and the communication interface 35 outputs the selected second distribution control signal (ST24).

Further, the processor 31 traces each article 4a, and can detect the state of conveyance of each article 4a. That is, the processor 31 can detect the position of each article 4a, the conveyance interval of each article 4a, and the like. In addition, the processor 31 traces each tray 107a which is circularly conveyed by the conveyance sorting section 104, and can detect the state of conveyance of each tray 107a. That is, the processor 31 can detect the position of each tray 107a, the conveyance interval of each tray 107a, and the like. The processor 31 selects the first conveyance control signal corresponding to the state of conveyance of each article 4a and the state of conveyance of each tray 107a, and the communication interface 35 outputs the selected first conveyance control signal (ST25). The number of times of selection and output of the first conveyance control signal is not limited to 1; the first conveyance control signal is appropriately selected and output according to the state of conveyance.

Similarly, the processor 31 traces each article 4b, and can detect the state of conveyance of each article 4b. That is, the processor 31 can detect the position of each article 4b, the conveyance interval of each article 4b, and the like. In addition, the processor 31 traces each tray 107b which is circularly conveyed by the conveyance sorting section 104, and can detect the state of conveyance of each tray 107b. That is, the processor 31 can detect the position of each tray 107b, the conveyance interval of each tray 107b, and the like. The processor 31 selects the second conveyance control signal corresponding to the state of conveyance of each article 4b and the state of conveyance of each tray 107b, and the communication interface 35 outputs the selected second conveyance control signal (ST25). The number of times of selection and output of the second conveyance control signal is not limited to 1; the second conveyance control signal is appropriately selected and output according to the state of conveyance.

Further, the processor 31 selects a sorting control signal corresponding to the designated sorting destination of each article 4, and the communication interface 35 outputs the selected sorting control signal (ST26).

The distributing section 106 distributes the article 4a distinguished as the lightweight article in the first direction based on the first distribution control signal (ST17), and the first conveyance section 102 conveys the article 4a to be distributed in the first direction. Furthermore, the distributing section 106 distributes the article 4b distinguished as the heavyweight article in the second direction based on the second distribution control signal (ST17), and the second conveyance section 103 conveys the article 4b to be distributed in the second direction.

The first conveyance section 102 controls conveyance of each article 4a based on the first conveyance control signal, and conveys and delivers the article 4a toward a tray 107a (target tray) among the plurality of trays 107 conveyed by the conveyance sorting section 104 (ST18). The first conveyance speed adjustment section 102a variably controls the conveyance speed of the article 4a based on the first conveyance control signal designating a first speed (standard speed), a second speed (high speed) faster than the first speed, or a third speed (low speed) slower than the first speed, and opens the stopper at a predetermined timing to adjust the timing at which the article 4a is delivered to the tray 107a conveyed by the conveyance sorting section 104.

Furthermore, the second conveyance section 103 controls conveyance of each article 4b based on the second conveyance control signal, and conveys and delivers the article 4b toward a tray 107b (target tray) among the plurality of trays 107 conveyed by the conveyance sorting section 104 (ST18). The first conveyance speed adjustment section 102a variably controls the conveyance speed of the article 4b based on the second conveyance control signal designating a first speed (standard speed), a second speed (high speed) faster than the first speed, or a third speed (low speed) slower than the first speed, and opens the stopper at a predetermined timing to adjust the timing at which the article 4b is delivered to the tray 107b conveyed by the conveyance sorting section 104.

Further, the conveyance sorting section 104 discharges the article 4a from the tray 107a at a predetermined timing based on the sorting control signal, and sorts the article 4a to a designated sorting destination (ST19). Similarly, the conveyance sorting section 104 discharges the article 4b from the tray 107b at a predetermined timing based on the sorting control signal, and sorts the article 4b to a designated sorting destination (ST19).

For example, the conveyance sorting section 104 includes the opening member that opens a part of the tray 107a, and by driving the opening member based on the sorting control signal, the part of the tray 107a that is being conveyed opens at the predetermined timing, and the article 4a in the tray 107a falls toward the designated sorting destination (ST19). Further, the conveyance sorting section 104 includes a mechanism for inclining the tray 107b, and by driving the inclining mechanism based on the sorting control signal, the tray 107b that is being conveyed is inclined at the predetermined timing, and the article 4b (or the article 4a) in the tray 107b slides down toward the designated sorting destination (ST19). Alternatively, the conveyance sorting section 104 includes a mechanism for pushing out the article 4b (or the article 4a) in the tray 107b, and by driving the pushing-out mechanism based on the sorting control signal, the article 4b (or the article 4a) in the tray 107b that is being conveyed is pushed out at the predetermined timing, and the article 4b (or the article 4a) slides down toward the designated sorting destination (ST19).

FIG. 4 is a flowchart illustrating an example of conveyance control of an article (for example, a lightweight article) to a tray of the first type by the control server of the article sorting system according to the embodiment.

The processor 31 selects the first conveyance control signal according to an initial setting. For example, the processor 31 selects the first conveyance control signal designating the standard speed (ST25101). The first conveyance speed adjustment section 102a conveys the article 4a at the standard speed based on the first conveyance control signal designating the standard speed.

When the distance to the article 4a in front becomes longer than a first distance based on the state of conveyance of the article 4a in the first conveyance section 102, the processor 31 determines that there is an empty space in front (ST25102, YES), and selects the first conveyance control signal designating high speed (acceleration) (ST25103). The first conveyance speed adjustment section 102a conveys the article 4a at the high speed based on the first conveyance control signal designating the high speed. As a result, the distance to the article 4a in front is reduced.

Furthermore, when the distance to the article 4a in front becomes shorter than a second distance (the second distance<the first distance) based on the state of conveyance of the article 4a in the first conveyance section 102, the processor 31 determines that there is an article in front (ST25104, YES), and selects the first conveyance control signal designating low speed (deceleration) (ST25105). The first conveyance speed adjustment section 102a conveys the article 4a at the low speed based on the first conveyance control signal designating the low speed. Thus, collision with the article 4a in front is avoided.

By the stopper of the first conveyance speed adjustment section 102a, the article 4a is held at a position immediately before the conveyance sorting section 104 (standby place of the first conveyance speed adjustment section 102a) (completion of standby of the article 4a). When the processor 31 detects a standby state in which the article 4a is held by the stopper (ST25106, YES) and detects that the tray 107a circulated and conveyed by the conveyance sorting section 104 has reached a predetermined position (that is, at a timing of receiving the article 4a) (ST25107, YES), the processor 31 selects a first conveyance control signal instructing opening of the stopper in order to deliver the article 4a toward the tray 107a circulated and conveyed by the conveyance sorting section 104 (ST25110). The first conveyance speed adjustment section 102a opens the stopper based on the first conveyance control signal that instructs opening of the stopper, and delivers the article 4a toward the tray 107a that is circulated and conveyed by the conveyance sorting section 104. The article 4a is delivered to the tray 107a included in the plurality of trays 107 circulated and conveyed by the conveyance sorting section 104 at an appropriate timing by the aforementioned first conveyance control signal.

Even if the processor 31 does not detect that the tray 107a circulated and conveyed by the conveyance sorting section 104 has reached the predetermined position (ST25107, NO), the processor 31 may select the first conveyance control signal for instructing the stopper to open (ST25110), when the processor 31 detects that the article 4b is not held in the standby place of the second conveyance speed adjustment section 103a (ST25108, YES) and that the tray 107b circulated and conveyed by the conveyance sorting section 104 has reached the predetermined position (that is, at a timing of receiving the article 4) (ST25109, YES). The first conveyance speed adjustment section 102a opens the stopper based on the first conveyance control signal that instructs opening of the stopper, and delivers the article 4a to the tray 107b circulated and conveyed by the conveyance sorting section 104. As a result, the waiting time of the article 4a can be reduced, and the throughput can be improved.

FIG. 5 is a flowchart illustrating an example of conveyance control of an article (for example, a heavyweight article) to a tray of the second type by the control server of the article sorting system according to the embodiment.

The processor 31 selects the second conveyance control signal according to the initial setting. For example, the processor 31 selects the second conveyance control signal designating the standard speed (ST25201). The second conveyance speed adjustment section 103a conveys the article 4b at the standard speed based on the second conveyance control signal designating the standard speed.

When the distance to the article 4b in front becomes longer than the first distance based on the state of conveyance of the article 4b in the second conveyance section 103, the processor 31 determines that there is an empty space in front (ST25202, YES), and selects the second conveyance control signal designating high speed (acceleration) (ST25203). The second conveyance speed adjustment section 103a conveys the article 4b at the high speed based on the second conveyance control signal designating the high speed. As a result, the distance to the article 4b in front is reduced.

Furthermore, when the distance to the article 4b in front becomes shorter than the second distance (the second distance<the first distance) based on the state of conveyance of the article 4b in the second conveyance section 103, the processor 31 determines that there is an article in front (ST25204, YES), and selects the second conveyance control signal designating the low speed (deceleration) (ST25202). The second conveyance speed adjustment section 103a conveys the article 4b at the low speed based on the second conveyance control signal designating the low speed. Thus, collision with the article 4b in front is avoided.

By the stopper of the second conveyance speed adjustment section 103a, the article 4b is held at a position immediately before the conveyance sorting section 104 (standby place of the second conveyance speed adjustment section 103a) (completion of standby of the article 4b). When the processor 31 detects a standby state in which the article 4b is held by the stopper (ST25206, YES) and detects that the tray 107b circulated and conveyed by the conveyance sorting section 104 has reached a predetermined position (that is, at a timing of receiving the article 4*b*) (ST25207, YES), the processor 31 selects a second conveyance control signal instructing opening of the stopper in order to deliver the article 4*b* toward the tray 107*b* circulated and conveyed by the conveyance sorting section 104 (ST25210). The second conveyance speed adjustment section 103*a* opens the stopper based on the second conveyance control signal that instructs opening of the stopper, and delivers the article 4*b* toward the tray 107*b* that is circulated and conveyed by the conveyance sorting section 104. The article 4*b* is delivered to the tray 107*b* included in the plurality of trays 107 circulated and transported by the conveyance sorting section 104 at an appropriate timing by the aforementioned second conveyance control signal.

Although the present embodiment is limited to the case where the article 4*b* is delivered to the tray 107*b*, the article 4*a* may be delivered to the tray 107*b* depending on the situation and the article 4*b* may be delivered to the tray 107*a* depending on the situation.

As described above, according to the present embodiment, it is possible to provide an article conveyance sorting apparatus, an article sorting system, and a control server that can deal with various articles. For example, various articles having different weights can be conveyed and sorted by the article conveyance sorting apparatus in a limited space. In a case where the article information includes information indicating whether or not the article is fragile, a fragile article may be determined as an article 4*a* and sorted by a sliding tray, and an article difficult to break may be determined as an article 4*b* and sorted by an openable tray. In a case where the article information includes information indicating whether or not a shape is easy to roll, an article that is difficult to roll may be determined as an article 4*a* and sorted by a sliding tray, and an article that is easy to roll may be determined as an article 4*b* and sorted by an openable tray.

Although the articles 4 taken in by the single take-in section 101 are distributed to a plurality of paths in midstream, the articles 4 are conveyed with the conveyance intervals appropriately shortened by providing the first conveyance speed adjustment section 102*a* and the second conveyance speed adjustment section 103*a*. Therefore, it is possible to prevent a decrease in conveyance sorting efficiencies.

When there is no article 4*b* in the standby state and the tray 107*a* arrives earlier than the tray 107*b*, the article 4*a* in the standby state conveyed by the first conveyance section 102 is delivered toward the tray 107*b*, so that it is also possible to prevent a decrease in conveyance sorting efficiencies.

Further, the ratio between the trays 107*a* and the trays 107*b* included in the plurality of trays 107 circulated and conveyed by the conveyance sorting section 104 may be set to an arbitrary ratio. In addition, the arrangement order of the trays 107*a* and the trays 107*b* may be set arbitrarily. By monitoring the state of conveyance of the tray 107*a* and the tray 107*b*, the processor 31 can feed the article 4*a* at an appropriate timing to the tray 107*b* (or the tray 107*a*) that is circulated and conveyed at an arbitrary ratio and in an arbitrary order, and can similarly feed the article 4*b* at an appropriate timing to the tray 107*b* that is circulated and conveyed at an arbitrary ratio and in an arbitrary order.

While certain embodiments have been described, these embodiments have been presented by way of example only, and are not intended to limit the scope of the invention. The novel embodiments described herein can be implemented in a variety of other forms; furthermore, various omissions, substitutions, and changes can be made without departing from the spirit of the invention. The embodiments and their modifications are covered by the accompanying claims and their equivalents, as would fall within the scope and gist of the inventions.

The invention claimed is:

1. An article conveyance sorting apparatus comprising:
a distributing section that distributes an article in a first direction or a second direction based on a first distribution control signal or a second distribution control signal corresponding to a distinguishing result of the article distinguished based on article information;
a first conveyance section that receives the article distributed in the first direction, and conveys the article based on a first conveyance control signal toward a tray of a first type among a plurality of trays sequentially conveyed;
a second conveyance section that receives the article distributed in the second direction, and conveys the article based on a second conveyance control signal toward a tray of a second type among the plurality of trays sequentially conveyed; and
a conveyance sorting section that conveys the plurality of trays including the tray of the first type and the tray of the second type, and sorts each of articles conveyed by the plurality of trays to a designated sorting destination based on a sorting control signal,
wherein the conveyance sorting section conveys the plurality of trays including an openable tray, which is the tray of the first type, and a sliding tray, which is the tray of the second type, and discharges the article from the openable tray or the sliding tray based on the sorting control signal to sort the article to the designated sorting destination.

2. The article conveyance sorting apparatus according to claim 1, wherein
the first conveyance section includes a first conveyance speed adjustment section,
the second conveyance section includes a second conveyance speed adjustment section,
the first conveyance speed adjustment section variably controls a conveyance speed of the article based on the first conveyance control signal, and
the second conveyance speed adjustment section variably controls the conveyance speed of the article based on the second conveyance control signal.

3. An article sorting system comprising:
the article conveyance sorting apparatus according to claim 1; and
a control server, wherein
the control server distinguishes the article based on an article weight included in the article information, and outputs the first distribution control signal or the second distribution control signal according to the distinguishing result of the article.

4. The article sorting system according to claim 3, wherein the control server designates a sorting destination of the article based on article sorting information included in the article information, and outputs the sorting control signal corresponding to the designated sorting destination.

5. The article sorting system according to claim 3, wherein the control server detects a state of conveyance of the tray of the first type and the tray of the second type by the conveyance sorting section, and outputs, based on the state of conveyance, the first conveyance control signal for controlling a timing of delivery of the article toward the tray of the first type by the first conveyance section, and the second conveyance control signal for controlling a timing of delivery of the article toward the tray of the second type by the second conveyance section.

6. A control server comprising:

a processor configured to select a first distribution control signal or a second distribution control signal for distributing an article to a first conveyance section or a second conveyance section based on a distinguishing result of the article distinguished based on article information, select a first conveyance control signal for conveying the article from the first conveyance section toward a tray of a first type included in a plurality of trays conveyed by a conveyance sorting section, select a second conveyance control signal for conveying the article from the second conveyance section toward a tray of a second type included in the plurality of trays conveyed by the conveyance sorting section, and select a sorting control signal for sorting the article conveyed by the plurality of trays to a designated sorting destination; and an interface that outputs a first distribution control signal or a second distribution control signal to a distributing section that distributes an article to the first conveyance section or the second conveyance section, outputs the first conveyance control signal or the second conveyance control signal to the first conveyance section or the second conveyance section, and outputs the sorting control signal to the conveyance sorting section, wherein the conveyance sorting section conveys the plurality of trays including an openable tray, which is the tray of the first type, and a sliding tray, which is the tray of the second type, and discharges the article from the openable tray or the sliding tray based on the sorting control signal to sort the article to the designated sorting destination.

\* \* \* \* \*